W. W. YARBROUGH.
ATTACHMENT FOR CRANK SHAFTS.
APPLICATION FILED JULY 12, 1920.
1,390,417.
Patented Sept. 13, 1921.
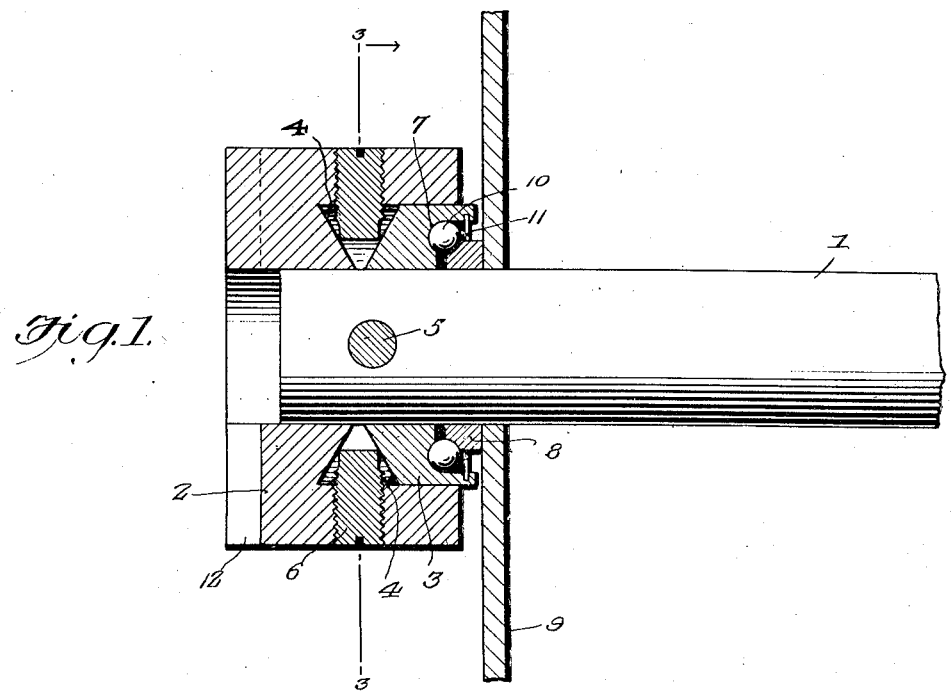
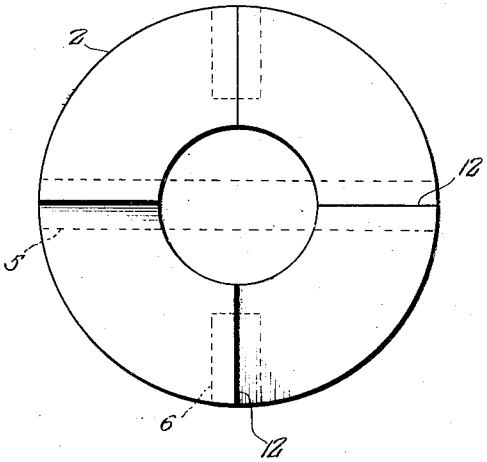
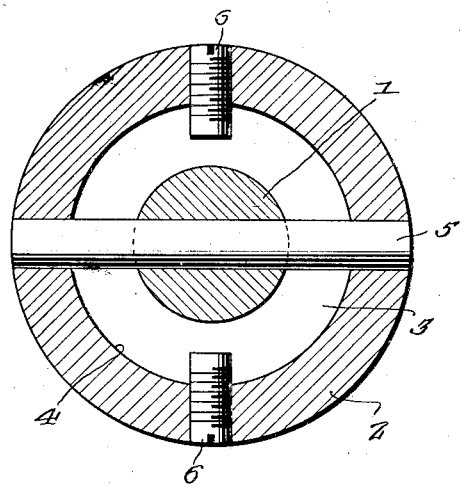
WITNESSES
INVENTOR
W.W.Yarbrough,
BY
ATTORNEYS

UNITED STATES PATENT OFFICE.

WALTER W. YARBROUGH, OF MEMPHIS, TENNESSEE.

ATTACHMENT FOR CRANK-SHAFTS.

1,390,417.  Specification of Letters Patent.  Patented Sept. 13, 1921.

Application filed July 12, 1920. Serial No. 395,677.

*To all whom it may concern:*

Be it known that I, WALTER W. YARBROUGH, a citizen of the United States, and a resident of Memphis, in the county of Shelby and State of Tennessee, have invented certain new and useful Improvements in Attachments for Crank-Shafts, of which the following is a specification.

My invention is an improvement in attachments for crank shafts, and has for its object to provide an attachment of the character specified adapted for use with the crank shafts of motor vehicles for receiving end thrust and for removing the strain from the main bearing produced by the clutch spring, to retain the magnetos in good order and to obviate the necessity of spinning the crank to start the motor.

In the drawings:

Figure 1 is a vertical section through the attachment;

Fig. 2 is a front view of the ratchet wheel;

Fig. 3 is a section on the line 3—3 of Fig. 1.

The present embodiment of the invention is shown in connection with the crank shaft 1 of a motor vehicle, and the attachment comprises a pair of cones 2 and 3, the cone 2 being formed in the fan pulley wheel, and these cones are arranged with their conical faces adjacent. The cone 2 is recessed on that face adjacent to the cone 3, as indicated at 4, to receive the said cone 3, and the tapering end of said cone 2 is within this recess. The cones are pinned to the shaft 1 by a cross pin 5 which passes through recesses in the cones at their apices, and through a diametrical opening in the shaft, as clearly shown in Figs. 1 and 3, and set screws 6 are threaded through radial openings in the cone 2, at the recess 4, the inner ends of the screws extending into the recess between the conical surfaces of the cone, as shown in Fig. 1.

That face of the cone 3 which is remote from the cone 2 is recessed, as shown at 7, to form one section of a ball race, and the other section 8 of the race is held on the crank shaft adjacent to the cylinder, indicated at 9.

A ball bearing 10 is arranged between the races, and there is provided a guard or washer 11 at the outer end of the recess in the cone 3, as clearly shown in Fig. 1, this washer almost closing the space between the wall of the recess 7 and the section 8 of the race. That face of the cone 2 which is outward is provided with ratchet teeth, indicated at 12, for engagement by the crank. It will be evident from the description that all of the inward end thrust is taken by the ball bearings. The cone 2 is the fan belt pulley, and in order to adjust the device it is only necessary to remove the fan belt and, with a screwdriver, turn the set screws. These screws operate between the conical surfaces and when they are turned inwardly they will move the cone 2 away from the cone 3. When they are turned outwardly the cones will be moved together.

Because of the fact that the device takes end thrust and eliminates end motion, the magnets and coils are kept properly adjusted at all times, thus giving a strong spark and making the motor easy to crank. The attachment takes the strain off the main bearing, which is produced by the clutch spring, and the attachment may be attached to any motor where the magneto is fastened directly to the crank shaft.

I claim:

1. In combination, a motor crank shaft having a fan belt pulley at the end thereof, said pulley being recessed on its inner face and the bottom of the recess being conical and having its convex surface toward the recessed face of the pulley, a cone shaped ring fitting about the crank shaft and within the recess of the fan belt and having its conical surface facing that of the fan belt, a pin extending transversely of the crank shaft and the fan belt at the conical surface of the cone and belt, and set screws threaded through the fan belt and engaging the conical surfaces for moving said surfaces away from each other, said cone shaped ring carrying a ball bearing comprising a bearing and a sectional race, the cone shaped member carrying one section of the race and the other section abutting the crank case.

2. In combination, a motor crank shaft having a fan belt pulley at the end thereof, said pulley being recessed on its inner face and the bottom of the recess being conical and having its convex surface toward the recessed face of the pulley, a cone shaped ring fitting about the crank shaft and within the recess of the fan belt and having its conical surface facing that of the fan belt, a pin extending transversely of the crank shaft and the fan belt at the conical surfaces of the cone and fan belt, and set screws threaded through the fan belt and engaging the conical surfaces for moving said surfaces away from each other.

WALTER W. YARBROUGH.